United States Patent
Braunheim et al.

(10) Patent No.: US 10,279,289 B2
(45) Date of Patent: *May 7, 2019

(54) FILTER DEVICE

(71) Applicant: Mahle International GmbH, Stuttgart (DE)

(72) Inventors: Michael Braunheim, Goeppingen (DE); Torsten Lika, Stuttgart (DE)

(73) Assignee: Mahle International GmbH (DE)

( * ) Notice: Subject to any disclaimer, the term of this patent is extended or adjusted under 35 U.S.C. 154(b) by 470 days.

This patent is subject to a terminal disclaimer.

(21) Appl. No.: 15/135,203

(22) Filed: Apr. 21, 2016

(65) Prior Publication Data

US 2017/0080366 A1 Mar. 23, 2017

Related U.S. Application Data

(63) Continuation of application No. 13/496,250, filed as application No. PCT/EP2010/062585 on Aug. 27, 2010, now Pat. No. 9,333,448.

(30) Foreign Application Priority Data

Sep. 15, 2009 (DE) .................. 10 2009 041 523

(51) Int. Cl.
*B01D 35/30* (2006.01)
*B01D 36/00* (2006.01)
(Continued)

(52) U.S. Cl.
CPC .............. *B01D 35/30* (2013.01); *B01D 29/11* (2013.01); *B01D 35/005* (2013.01);
(Continued)

(58) Field of Classification Search
None
See application file for complete search history.

(56) References Cited

U.S. PATENT DOCUMENTS

| 3,312,350 A | 4/1967 | Kasten |
| 3,465,883 A | 9/1969 | Jumper |

(Continued)

FOREIGN PATENT DOCUMENTS

| DE | 3903675 A1 | 8/1990 |
| DE | 3941996 A1 | 6/1991 |

(Continued)

OTHER PUBLICATIONS

English Translation of DE 10 2005 000 658 A1.
(Continued)

*Primary Examiner* — Thomas M Lithgow
(74) *Attorney, Agent, or Firm* — Fishman Stewart PLLC

(57) ABSTRACT

A filter device may include a ring filter element arranged in a filter housing in an upright manner. The ring filter element may have an upper end disc, a lower end disc, a filter material arranged therebetween, and a dirt pot provided on the lower end disc. The dirt pot may have a water separator arranged therein and provided on the lower end disc, a protruding pin, and an opening on a base side of the dirt pot. The filter device may include a functional element having a channel configured to receive the protruding pin. A portion of the functional element may be configured to penetrate the opening of the dirt pot such that the ring filter element is sealed at the opening. The portion of the functional element may have at least one water discharge opening. The filter device may be operational when the pin engages into the channel.

27 Claims, 3 Drawing Sheets

(51) Int. Cl.
    *F02M 37/24* (2019.01)
    *B01D 35/153* (2006.01)
    *B01D 35/16* (2006.01)
    *B01D 29/11* (2006.01)
    *B01D 35/00* (2006.01)
    *B01D 27/00* (2006.01)
    *B01D 27/08* (2006.01)
    *B01D 17/04* (2006.01)
    *F01M 11/03* (2006.01)

(52) U.S. Cl.
    CPC ........... *B01D 35/153* (2013.01); *B01D 35/16* (2013.01); *B01D 36/003* (2013.01); *B01D 36/006* (2013.01); *F02M 37/24* (2019.01); *B01D 17/045* (2013.01); *B01D 27/00* (2013.01); *B01D 27/08* (2013.01); *B01D 2201/291* (2013.01); *B01D 2201/295* (2013.01); *B01D 2201/305* (2013.01); *B01D 2201/4007* (2013.01); *B01D 2201/4053* (2013.01); *B01D 2201/4084* (2013.01); *F01M 11/03* (2013.01)

(56) References Cited

U.S. PATENT DOCUMENTS

| | | | |
|---|---|---|---|
| 3,502,218 A | 3/1970 | Tuffnell | |
| 4,497,714 A | 2/1985 | Harris | |
| 4,502,955 A | 3/1985 | Schaupp | |
| 4,619,764 A | 10/1986 | Church et al. | |
| 5,089,129 A | 2/1992 | Brigman | |
| 5,548,893 A | 8/1996 | Koelfgen | |
| 6,139,738 A | 10/2000 | Maxwell | |
| 6,409,804 B1 | 6/2002 | Cook et al. | |
| 6,706,181 B1 * | 3/2004 | Baumann | B01D 29/21 210/236 |
| 6,835,305 B1 | 12/2004 | Baumann et al. | |
| 6,936,169 B2 | 8/2005 | Baumann et al. | |
| 7,237,681 B2 | 7/2007 | Brieden et al. | |
| 7,527,739 B2 | 5/2009 | Jiang et al. | |
| 8,673,138 B2 | 3/2014 | Braunheim | |
| 9,108,125 B2 | 8/2015 | Braunheim | |
| 9,205,355 B2 | 12/2015 | Deschamps et al. | |
| 9,333,448 B2 * | 5/2016 | Braunheim | B01D 35/153 |
| 9,810,373 B2 | 11/2017 | Braunheim | |
| 10,035,090 B2 | 7/2018 | Kollmann et al. | |
| 2005/0274664 A1 | 12/2005 | Stoehr et al. | |
| 2007/0084776 A1 | 4/2007 | Sasur | |
| 2007/0240390 A1 | 10/2007 | Becker et al. | |
| 2008/0024719 A1 | 1/2008 | Kamishita et al. | |
| 2009/0008321 A1 | 1/2009 | Tanner et al. | |
| 2011/0017649 A1 | 1/2011 | Sasur | |
| 2011/0089091 A1 | 4/2011 | Grass et al. | |

FOREIGN PATENT DOCUMENTS

| | | |
|---|---|---|
| DE | 19951085 A1 | 4/2001 |
| DE | 10308427 A1 | 9/2004 |
| DE | 102005000658 A1 | 7/2006 |
| DE | 102005015194 A1 | 10/2006 |
| DE | 202006006084 U1 | 8/2007 |
| DE | 202006017305 U1 | 3/2008 |
| DE | 102007048550 A1 | 4/2008 |
| DE | 102007009352 A1 | 8/2008 |
| EP | 0260069 A2 | 3/1988 |
| EP | 0385113 A2 | 9/1990 |
| EP | 0405447 A2 | 1/1991 |
| EP | 1233173 A2 | 8/2002 |
| EP | 1695753 A1 | 8/2006 |
| WO | WO-2006105755 A1 | 10/2006 |
| WO | WO-2009080455 A1 | 7/2009 |

OTHER PUBLICATIONS

Abstract of DE 103 08 427 A1.
Abstract of DE 10 2007 039679 A1 equivalent application to DE 20 2006 017 305 A1.
Absract for DE 39 41 996 A1 of equivalent application EP 0433664.
Abstract of DE 10 2007 039679 A1 equivalent application to DE 39 41 996 A1.
Abstract of DE 10 2007 009 352 A1.
Abstract of DE 199 51 085 A1.
Abstract DE 10 2005 015 194 A1.
Abstract JP 7217577.
International Search Report PCT/EP2010/062585, dated Dec. 6, 2010.
International Search Report PCT/EP2010/062585.
English abstract for EP-0385113.
Search Report for EP-10751600.7.
English abstract for EP-1233173.
English abstract for DE-102007048550.
English Abstract for DE 3903675 A1.

* cited by examiner

FILTER DEVICE

CROSS-REFERENCE TO RELATED APPLICATIONS

This application is a Continuation of U.S. patent application Ser. No. 13/496,250, filed May 30, 2012, which is a National Stage of International Application No. PCT/EP2010/062585 filed Aug. 27, 2010, which claims priority to German Patent Application No. 10 2009 041 523.8 filed Sep. 15, 2009, all of which are hereby incorporated by reference in their entirety.

TECHNICAL FIELD

The present invention relates to a filter device having a ring filter element arranged in a filter housing in an upright manner, which ring filter element has an upper and a lower end disc. The invention further relates to a ring filter element for such a filter device.

BACKGROUND

A generic filter device is sufficiently known and is to be found in almost all modern motor vehicles, used for example as an oil- or fuel filter.

In order to be able to guarantee a problem-free filter effect, it is often important for the manufacturers of such filter devices that only filter elements which have been authorized or produced by them are used. With the use of filter elements of external brands or imitations, namely not only can be filter performance be impaired, but at the same time also damage can be caused. On the other hand, it is desirable to be able to produce and offer filter elements for such filter devices at as favourable a cost as possible.

The present invention is therefore concerned with the problem of providing for a filter device of the generic type an improved or at least an alternative embodiment, which in particular enables exclusively the use of authorized filter elements.

This problem is solved according to the invention by the subjects of the independent claims. Advantageous embodiments are the subject of the dependent claims.

SUMMARY

The present invention is based on the general idea of providing a ring filter element, known per se, which is arranged in an upright manner in a filter housing of a filter device, with a dirt pot on the base side, on which a protruding, nozzle-shaped pin is constructed, by which the ring filter element engages into a channel provided on a filter housing pot or on a functional element, in so far as the ring filter element is correctly mounted. The dirt pot is arranged here on the lower end disc of the ring filter element, wherein the socked-shaped pin is constructed in one piece with the dirt pot, and an operation of the filter device is then enabled exclusively in so far as the pin of the dirt pot engages into the channel on the filter housing pot side or respectively on the functional element side. The dirt pot and hence also the socked-shaped pin are preferably constructed here in one piece or in one part with a lower end disc of the ring filter element, in particular the dirt pot is welded onto the lower end disc of the ring filter element, for example by means of friction welding, ultrasonic welding or laser welding. A water separator is provided in addition inside the dirt pot, so that the dirt pot per se can be used both as a dirt-collecting chamber and also as a water-collecting chamber, and has on the base side at least one outlet for collected dirt or respectively for collected water. With the filter device according to the invention it is therefore possible that it can only be used in so far as ring filter elements which fit it are used with the pin on the dirt pot side; the use of other ring filter elements by which under certain circumstances the filter performance of the filter device could be impaired, can therefore be reliably prevented.

In an advantageous further development of the solution according to the invention, the water separator which is arranged inside the dirt pot is constructed as a coalescer and at the same time is welded onto the lower end disc of the ring filter element. Such a coalescer is able to collect and divert water particles and therefore for example to filter out water components present in the fuel, so that these can not arrive into the combustion engine and cause corrosion damage there. In this case, the filter device can be constructed for example as an oil- or fuel filter, wherein quite generally a construction as an air filter is also conceivable. The water separator is connected here to the lower end disc of the ring filter element, in particular is welded on, and can thereby be exactly positioned and fixed before the assembly or respectively before the closing of the dirt pot, which distinctly simplifies the manufacturing process of the filter device according to the invention.

In a further advantageous embodiment of the solution according to the invention, a guide is provided on the filter housing pot or on a functional element arranged therein, along which guide the pin of the dirt pot is guided on mounting of the ring filter element to the channel. Such a guide can be constructed for example in the manner of an incline, which enables an arbitrary insertion of the ring filter element, so that the latter slides by means of the pin along the guide into the channel and thereby a correct mounting can always be guaranteed. Such a guide can be realized on the one hand at a favourable cost, for example by a suitable injection mould, and on the other hand guarantees a distinctly simplified handling of the filter device according to the invention, because the ring filter element can be inserted into the filter housing pot in an arbitrary rotation angle position and can be transferred by a simple twisting into its proper and correct position. An incorrect mounting of the ring filter element can be thereby reliably ruled out.

Further important features and advantages of the invention will emerge from the subclaims, from the drawings and from the associated description of the figures with the aid of the drawings.

It shall be understood that the features mentioned above and to be explained in further detail below are able to be used not only in the respectively indicated combination, but also in other combinations or in isolation, without departing from the scope of the present invention.

Preferred example embodiments of the invention are illustrated in the drawings and are explained in further detail in the following description, wherein identical reference numbers refer to identical or similar or functionally identical components.

BRIEF DESCRIPTION OF THE DRAWINGS

There are shown, respectively diagrammatically.

DETAILED DESCRIPTION

Figure 1:
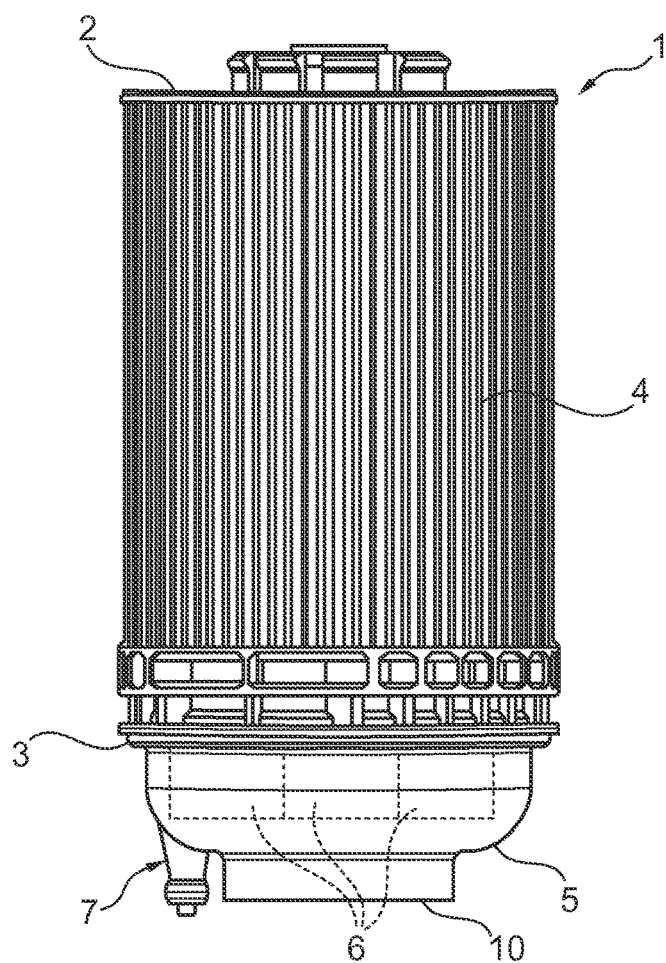
FIG. 1 a ring filter element according to the invention, in a side view.
Figure 2:
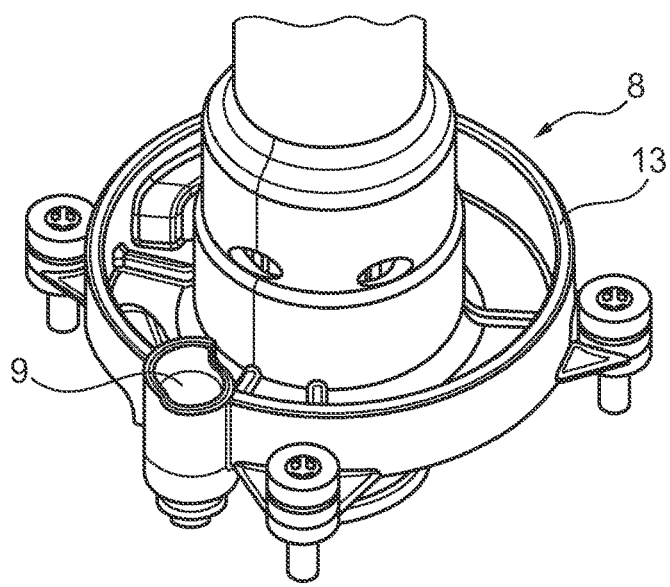
FIG. 2 a view onto a functional element.
Figure 3:
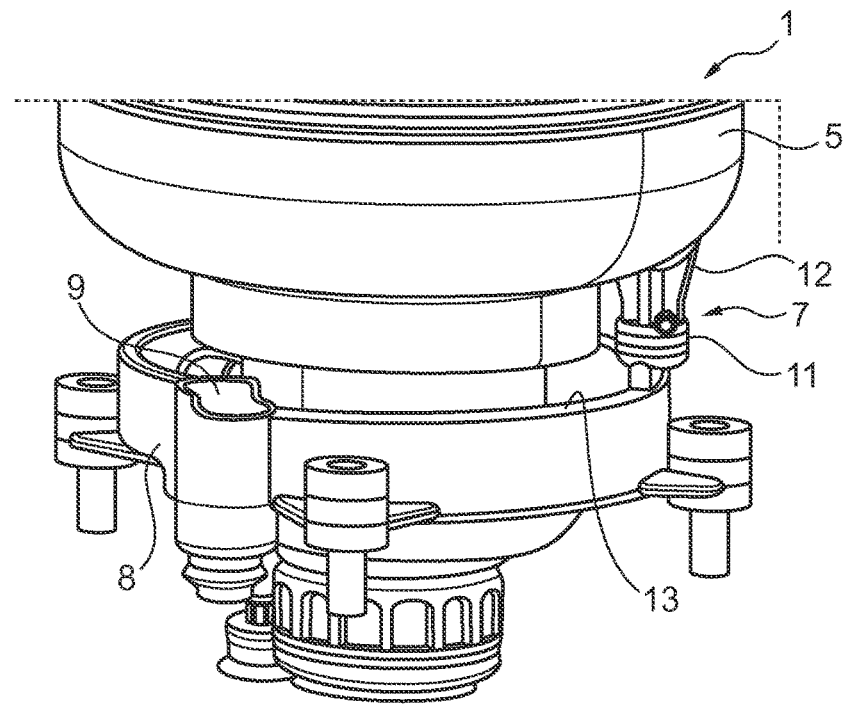
FIG. 3 a cooperation of the ring filter element with the functional element.
Figure 4:
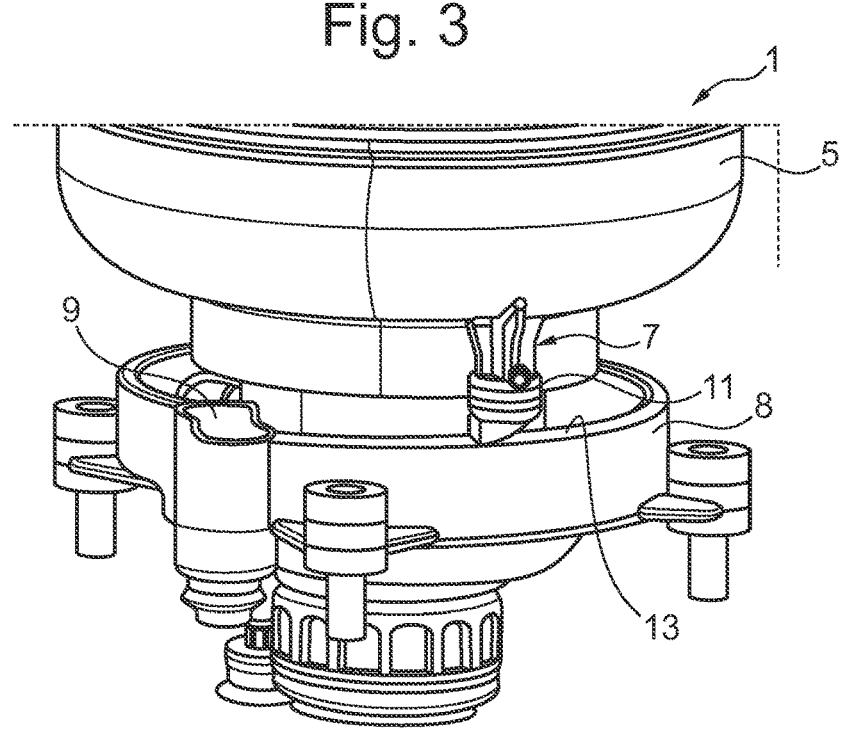
FIG. 4 an illustration as in FIG. 3, but with a different rotation angle position of the ring filter element, FIG. 5 a detail illustration of a pin, projecting in a nozzle shape, of the ring filter element before immersion into an associated channel, FIG. 6 an illustration as in FIG. 5, but after the immersion of the pin into the channel.
Figure 5:
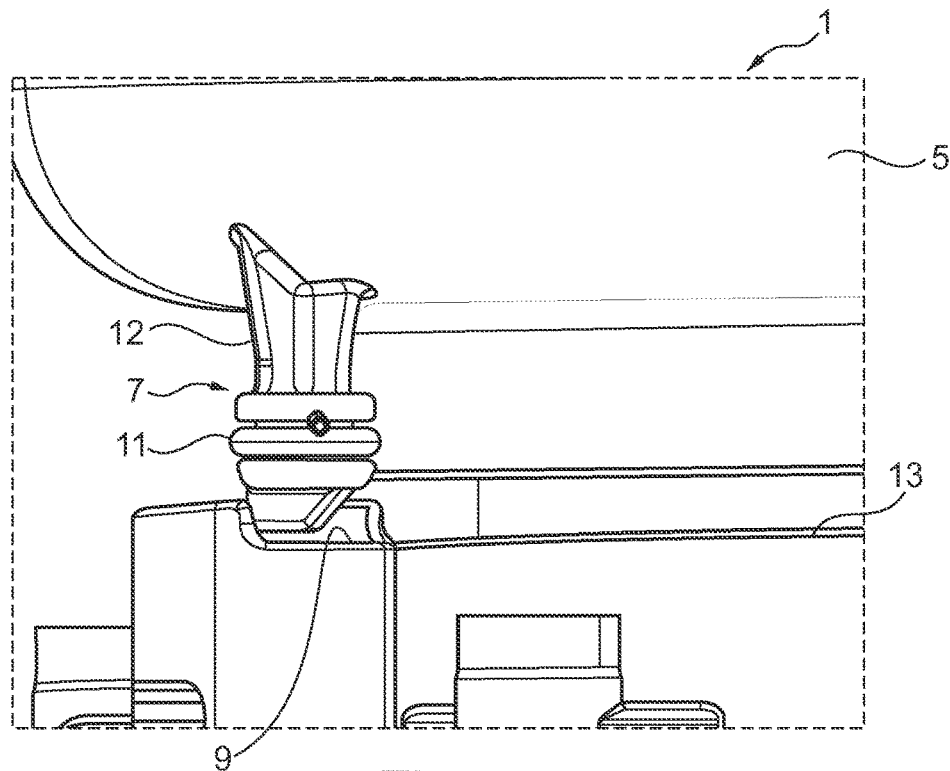
Figure 6:
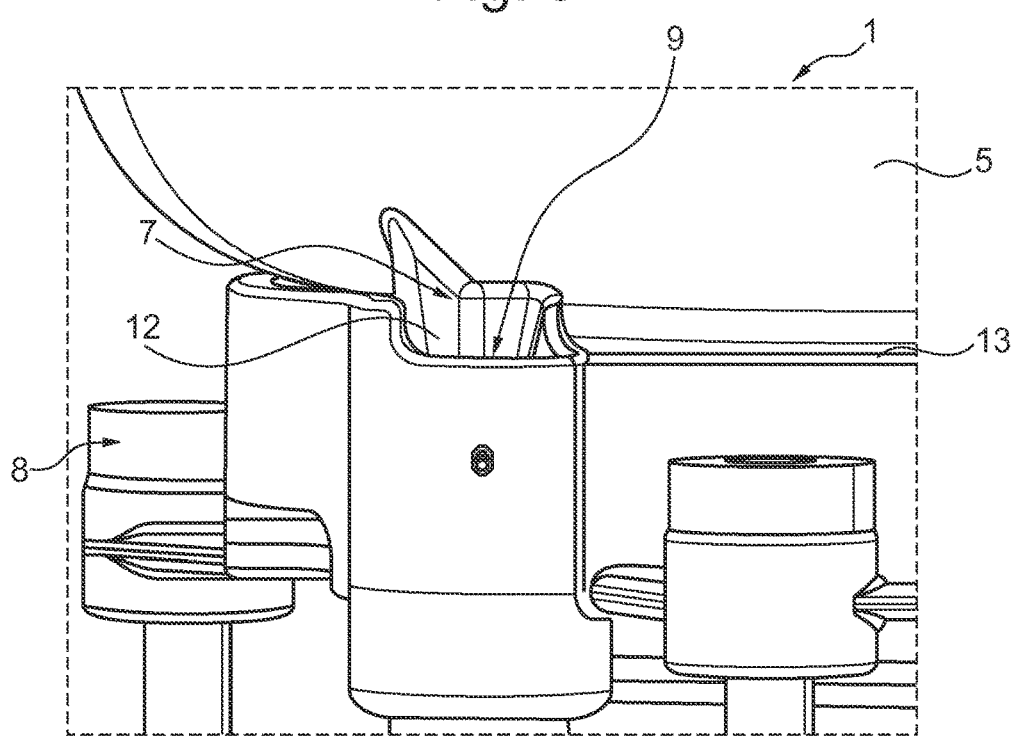

In accordance with FIG. 1, a ring filter element 1 according to the invention has an upper end disc 2 and a lower end disc 3. Between the two end discs 2 and 3 a filter material 4 is arranged, for example in the manner of a pleated star. The ring filter element 1 is arranged here in a similar manner to the illustration in FIG. 1 in an upright manner in a filter housing, not shown, of a filter device, for example an oil- or fuel filter. According to the invention, on the lower end disc 3 a dirt pot 5 is now provided, having a water separator 6 arranged therein and only sketched by a dashed line. A nozzle-shaped pin 7 is provided protruding downward on the dirt pot 5, which pin is constructed in a complementary manner to a channel 9 constructed on the filter housing pot, which is not shown, or on a functional element 8 (cf. FIG. 2) which is able to be inserted into this filter housing pot which is not shown. An operation of the complete filter device is then possible here exclusively in so far as the pin 7 engages into the channel 9, which can be constructed in particular as an idle channel.

Generally, the water separator 6 can be constructed as a so-called coalescer and can be welded to the lower end disc 3 of the ring filter element 1. The welding can take place for example by means of ultrasonic welding, friction welding or laser welding and guarantees a reliable positioning and fixing of the water separator 6 on the lower end disc 3 of the ring filter element 1, so that in a subsequent working step the dirt pot 5 can be connected with the end disc 3, in particular welded. Of course, a welding of the water separator 6 to the lower end disc 3 after the welding of the dirt pot 5 to the lower end disc 3 is also conceivable, wherein in this case the water separator 6 must be subsequently introduced through an opening 10 of the dirt pot 5 on the base side.

On viewing FIGS. 1 and 3 to 5, it can be seen that on the pin 7, i.e. in particular on its pin head, at least one sealing element 11 is arranged which tightly closes the channel 9 with the pin 7 engaging therein. The at least one sealing element 11 can be constructed here for example as a conventional O-ring seal. On viewing FIG. 5, it can be seen that the pin 7 has a shaft 12 which is cruciform in cross-section, and that the pin has the previously mentioned pin head adjoining thereto, wherein the cross-section profile of the shaft 12 gives the pin 7 a high degree of rigidity. For the correct introduction of the pin 7 in the channel 9, a guide 13 can be provided on the filter housing pot or on the functional element 8, with which guide in the best case the pin 7 slides along with low friction to the channel 9. The guide 13 can be constructed here for example in the manner of an incline.

The invention not only relates here to a complete filter device, consisting of filter housing and filter housing pot and functional element 8 arranged therein and ring filter element 1, but also to the ring filter element 1 as a separate component, in particular for the spare parts market. Through the construction of the ring filter element 1 in one piece together with the dirt pot 5 and in particular through the construction of the pin 7 and of the dirt pot 5 in one part, a complete part can therefore be produced, in particular also for the spare parts market, which on the one hand is favourably priced and which on the other hand guarantees that no unsuitable and non-authorized brands are used, which can weaken the filter performance and thereby, under certain circumstances, can cause damage. Of course, both the pin element 7 and also the dirt pot 5 can be constructed here from favourably priced plastic, in particular as a plastic injection moulded part. In the illustrations, the channel 9 is constructed as an idle channel.

The invention claimed is:

1. A filter device comprising:
   a ring filter element arranged in a filter housing in an upright manner, the ring filter element having an upper end disc, a lower end disc, a filter material arranged between the upper end disc and the lower end disc, and a dirt pot having a water separator arranged therein and provided on the lower end disc, the dirt pot having a protruding pin and an opening on a base side of the dirt pot,
   the dirt pot being configured to be inserted into a filter housing pot of the filter device, and
   a functional element having a channel configured to receive the pin, a portion of the functional element being configured to penetrate the opening of the dirt pot such that the ring filter element is sealed at the opening, the portion of the functional element further having at least one water discharge opening,
   wherein the filter device is operational when the pin engages into the channel.

2. The filter device according to claim 1, wherein the water separator is constructed as a coalesce and is welded onto the lower end disc of the ring filter element.

3. The filter device according to claim 2, wherein the dirt pot is welded onto the lower end disc of the ring filter element.

4. The filter device according to claim 1, wherein the filter device is constructed as at least one of an oil filter and a fuel filter.

5. The filter device according to claim 1, further comprising at least one sealing element arranged on the pin, the sealing element configured to tightly close the channel with the pin engaging therein.

6. The filter device according to claim 1, further comprising a guide arranged on at least one of the filter housing pot and the functional element and configured to guide the pin into the channel.

7. The filter device according to claim 5, wherein the pin has a shaft having cruciform cross-section and a pin head adjoining thereto, further wherein the at least one sealing element is arranged in a region of the pin head.

8. A ring filter element for a filter device comprising:
   an upper end disc and a lower end disc,
   a filter material arranged between the upper end disc and the lower end disc, and
   a dirt pot provided on the lower end disc and having a water separator arranged therein, wherein the dirt pot has a protruding pin and an opening on a base side of the dirt pot,
   wherein the opening is configured to receive a portion of a functional element such that the ring filter element is sealed at the opening, and the pin is configured to engage in a channel provided in the functional element such that the filter device is operational.

9. The ring filter element of claim 8, further comprising at least one sealing element arranged on the pin, the sealing element configured to tightly close the channel with the pin engaging therein.

10. The ring filter element of claim 9, wherein the pin has a shaft having cruciform cross-section and a pin head adjoining thereto, further wherein the at least one sealing element is arranged in a region of the pin head.

11. The ring filter element of claim 8, further comprising a guide arranged on the functional element and configured to guide the pin into the channel.

12. The ring filter element of claim 8, wherein the water separator is constructed as a coalesce and is welded onto the lower end disc of the ring filter element.

13. The ring filter element of claim 8, wherein the dirt pot is welded onto the lower end disc of the ring filter element.

14. The filter device according to claim 1, wherein the dirt pot is welded onto the lower end disc of the ring filter element.

15. The filter device according to claim 14, wherein the filter device is constructed as at least one of an oil filter and a fuel filter.

16. The filter device according to claim 14, further comprising at least one sealing element arranged on the pin, the sealing element configured to tightly close the channel with the pin engaging therein.

17. The filter device according to claim 2, further comprising at least one sealing element arranged on the pin, the sealing element configured to tightly close the channel with the pin engaging therein.

18. The filter device according to claim 17, wherein the pin has a shaft having cruciform cross-section, and a pin head adjoining thereto, further wherein the at least one sealing element is arranged in a region of the pin head.

19. The filter device according to claim 2, further comprising a guide arranged on the functional element and configured to guide the pin into the channel.

20. The filter device according to claim 1, wherein the dirt pot operates as a water-collecting chamber within the water separator.

21. A filter device comprising:
a ring filter element arranged in a filter housing in an upright manner, the ring filter element having an upper end disc, a lower end disc, a filter material arranged between the upper end disc and the lower end disc, and a dirt pot having a space for a water separator arranged therein and provided on the lower end disc, the dirt pot having a protruding pin and an opening on a base side of the dirt pot,
the dirt pot being configured to be inserted into a filter housing pot of the filter device, and
a functional element having a channel configured to receive the pin, a portion of the functional element being configured to penetrate the opening of the dirt pot such that the ring filter element is sealed at the opening, the portion of the functional element further having at least one water discharge opening,
wherein the filter device is operational when the pin engages into the channel.

22. The filter device according to claim 21, further comprising a water separator positioned within the space for the water separator, wherein the water separator is constructed as a coalesce and is welded onto the lower end disc of the ring filter element.

23. The filter device according to claim 22, wherein the dirt pot is welded onto the lower end disc of the ring filter element.

24. The filter device according to claim 21, wherein the filter device is constructed as at least one of an oil filter and a fuel filter.

25. The filter device according to claim 21, further comprising at least one sealing element arranged on the pin, the sealing element configured to tightly close the channel with the pin engaging therein.

26. The filter device according to claim 25, wherein the pin has a shaft having cruciform cross-section and a pin head adjoining thereto, further wherein the at least one sealing element is arranged in a region of the pin head.

27. The filter device according to claim 21, further comprising a guide arranged on at least one of the filter housing pot and the functional element and configured to guide the pin into the channel.

* * * * *